(12) United States Patent
Chuang

(10) Patent No.: US 9,113,603 B2
(45) Date of Patent: Aug. 25, 2015

(54) SOLAR GREENHOUSE STRUCTURE

(75) Inventor: Mei-Chen Chuang, New Taipei (TW)

(73) Assignee: LITE-ON GREEN TECHNOLOGIES, INC., Taipei (TW)

( * ) Notice: Subject to any disclaimer, the term of this patent is extended or adjusted under 35 U.S.C. 154(b) by 515 days.

(21) Appl. No.: 13/525,306

(22) Filed: Jun. 16, 2012

(65) Prior Publication Data

US 2012/0247009 A1  Oct. 4, 2012

Related U.S. Application Data

(63) Continuation-in-part of application No. 13/008,096, filed on Jan. 18, 2011, now abandoned.

(51) Int. Cl.
*A01G 9/24* (2006.01)

(52) U.S. Cl.
CPC ...................................... *A01G 9/243* (2013.01)

(58) Field of Classification Search
CPC ... A01G 9/243; A01G 9/1438; A01G 9/1469; A01G 9/24; F24J 2/0455; F24J 2/045
See application file for complete search history.

(56) References Cited

U.S. PATENT DOCUMENTS

| | | | | |
|---|---|---|---|---|
| 4,083,360 A | * | 4/1978 | Courvoisier et al. | 126/621 |
| 4,219,008 A | * | 8/1980 | Schultz | 126/592 |
| 4,289,120 A | * | 9/1981 | Ward | 126/623 |
| 4,416,260 A | * | 11/1983 | Proctor | 126/618 |
| 4,416,265 A | * | 11/1983 | Wallace | 126/660 |
| 7,281,353 B2 | * | 10/2007 | Konstantin | 49/82.1 |

FOREIGN PATENT DOCUMENTS

| | | | | |
|---|---|---|---|---|
| EP | 2230695 A2 | * | 9/2010 | H01L 31/0216 |
| JP | 2009129686 A | * | 6/2009 | |

* cited by examiner

*Primary Examiner* — David Parsley
*Assistant Examiner* — Danielle Clerkley
(74) *Attorney, Agent, or Firm* — Li & Cai Intellectual Property (USA) Office

(57) ABSTRACT

A solar greenhouse structure includes a plurality of supporting frames, a light-permitting roof supported by at least one supporting frame, and at least one solar panel disposed below the roof and near the bottom surface thereof. The instant disclosure uses thinner solar panels, where the supporting frames can be less rigid, in lowering the solar greenhouse cost.

11 Claims, 11 Drawing Sheets

SOLAR GREENHOUSE STRUCTURE

CROSS REFERENCE TO RELATED APPLICATIONS

This Application is a Continuation-in-Part of application Ser. No. 13/008,096, filed Jan. 18, 2011, now pending, and entitled SOLAR GREENHOUSE STRUCTURE.

BACKGROUND OF THE INVENTION

1. Field of the Invention

The instant disclosure relates to a solar greenhouse structure; and more particularly, to a solar greenhouse having a light weight and configurable structure.

2. Description of Related Art

With the increasing environmental awareness, solar power has been widely adopted for practical use. Solar panels in sophisticated modern devices, such as solar batteries or solar heaters, are used to convert solar radiation into useful forms of energy such as electricity or heat. To effectively obtain solar energy, the solar panels need to be mounted at unobstructed locations, usually in an elevated manner, by specially designed supporting structures.

A greenhouse is commonly used as an agricultural shelter having different types of covering materials that are usually transparent to solar radiation. Due to the nature of this agricultural structure, greenhouses are usually built in locations where sunlight is abundant. Thus, intuitively, the rooftop of a greenhouse structure is an ideal place for mounting solar panels. However, most conventional greenhouses are not designed to host solar panels. Particularly, most light-weight or low-budget greenhouses, lack the structural integrity to host solar panels on their rooftops. As a result, the remodeling cost for converting conventional greenhouses is often very high.

In addition, externally mounted solar panels must be rigid enough to withstand adverse weather conditions, such as rain and hails. Therefore, the external mounting of solar panels usually requires the use of thicker solar panels for added strength or additional protective layer. As a result, the cost of setting up a solar greenhouse is relatively high. The attempt to increase structural strength inevitably adds weight to the solar panel.

However, conventional greenhouses often use vinyl coverings; their main structures are usually not designed to withstand excessive weight loading. As a result, the additional weight on the solar panels makes them less suitable for external installation on conventional greenhouse structures, particularly to the roof structure thereof.

To resolve the above issues, the inventor researched and proposes the following design solutions to address the above shortcomings.

SUMMARY OF THE INVENTION

An embodiment of the instant disclosure provides a solar greenhouse structure. The purpose was to incorporate solar panels into agricultural greenhouses, especially for adding and protecting solar panels to existing greenhouses and lowering the remodeling cost.

To achieve the above objective, the instant disclosure provides a solar greenhouse structure, which comprises a plurality of supporting frames, a transparent roof supported by at least one supporting frame, and at least one solar panel disposed below the roof and near the bottom surface thereof.

The instant disclosure has the advantages of reducing solar panel dependency on the ambient condition, requiring less supporting frame rigidity, thereby reducing the overall greenhouse cost. In addition, the greenhouse is allowed to remove the thermal insulating layer during the summer time, to have cooler temperature with better ventilation. The existing greenhouse needs not to be remodeled. Instead, the solar panel of the instant disclosure is disposed directly into the existing greenhouse.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The main feature of a solar greenhouse structure of the instant disclosure is disposing solar panels inside the greenhouse, thereby reducing the solar greenhouse cost. By disposing the solar panels internally, the required mechanical strength of the solar panels are reduced, therefore thinner solar panels can be used. Correspondingly, the required rigidity of the supporting frames of the greenhouse is reduced also, which lowers the cost.

For the above thinner solar panels, more specifically, can be semi-transparent thin film solar module, dye-sensitized solar cells, or transparent solar modules.

Figure 1:
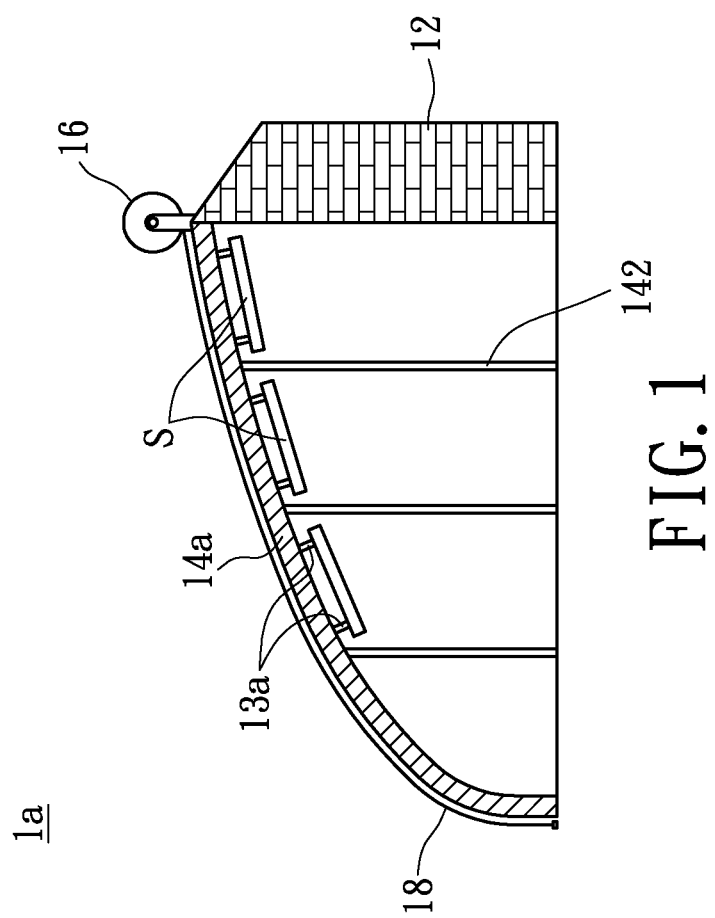
FIG. 1 shows a side view of a solar greenhouse structure for a first embodiment of the instant disclosure.
Figure 2:
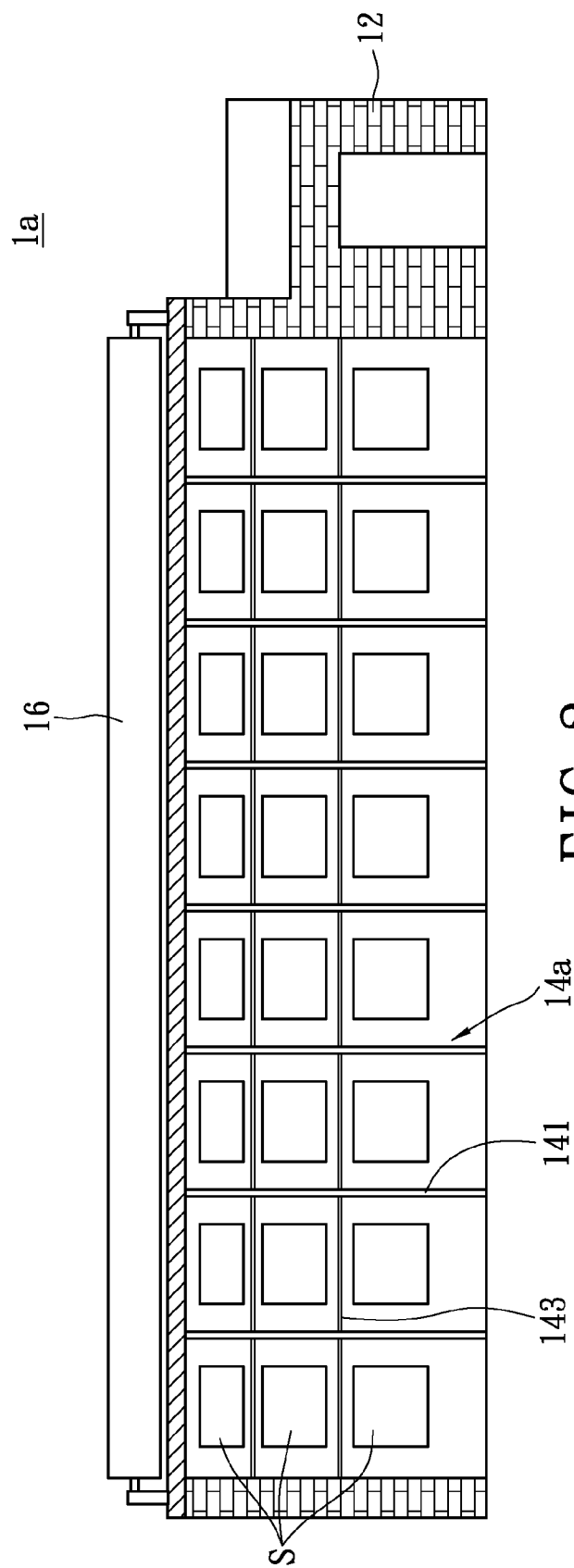
FIG. 2 shows a front view of the solar greenhouse structure for the first embodiment of the instant disclosure.

Please refer to FIGS. 1 and 2, which show a side and front view of a solar greenhouse structure of a first embodiment of the instant disclosure respectively. The instant embodiment is applied to agricultural type greenhouses. As shown in the figures, the solar greenhouse structure 1a comprises a plurality of supporting frames 14a, a plurality of poles 142, a transparent roof supported by the supporting frames 14a, and a plurality of solar panels S disposed below the roof 18 and near the bottom surface thereof.

For the instant embodiment, the transparent roof 18 of the agricultural greenhouse is a plastic thin film, so the solar panels S are better mounted on the supporting frames 14a. For the mounting option, the solar panels S can be hung off the supporting frames 14a, such as by using a plurality of mounting pieces (or mounting device) 13a as shown in FIG. 1. More specifically, as shown in FIG. 2, the solar panels S can be mounted on the transverse bars 143 or longitudinal bars 141.

The agricultural greenhouse of FIG. 1 is only an example, which is usually located in regions having gusty regional wind. Thus, a windbreak structure, such as the thermal insulating wall 12 is added as a wind barrier to shield the greenhouse and maintain its interior temperature. Meanwhile, acting as a wind barrier, the thermal insulating wall may include an entrance/exit of the greenhouse, as shown in FIG. 2. For large-scale nursing when the North wind occurs less frequently, the wind barrier can be excluded. At the top of the agricultural greenhouse of the instant embodiment, a crank 16 is disposed above the roof 18, or the plastic thin film, to provide a thermal insulating layer over the greenhouse for enhancing insulation effect at night time. The material makeup of the thermal insulating layer varies by region, with some places using a mat as the thermal insulating layer made of rice straws, wheatgrass, etc.

There are various types of greenhouses. If the abovementioned roof 18 is transparent and made of hard materials, such as glass or plastic panel, etc. to support the solar panels S, the solar panels S can be disposed thereon.

By suspending or attaching the solar panels, the instant disclosure allows the solar panels to be disposed freely based on need. Aside from utilizing the solar power, the solar panels further provide shadings against excessive ultraviolet light from harming the crops. In addition, the solar panels can be mounted directly to the existing greenhouse structure, which help to reduce the remodeling cost and promote solar greenhouses for practical use.

On the other hand, the solar panels on the roofs of conventional solar greenhouses must be tightly patterned to shield against the rain and wind. However, for the hot summer weather where adequate ventilation is needed, such design induces negative effect. For the solar greenhouse of the instant disclosure, the solar panels can be spaced apart from each other below the roof. When ventilation is needed, the roof 18, or the plastic thin film, can be taken away to create at least one vent path for ventilation. Such condition is illustrated on the left portion of the solar greenhouse structure in FIG. 1, where the solar panels are absent. If the roof is made of transparent and hard materials, mobile roof structures can be incorporated to meet the ventilation needs.

Figure 3:
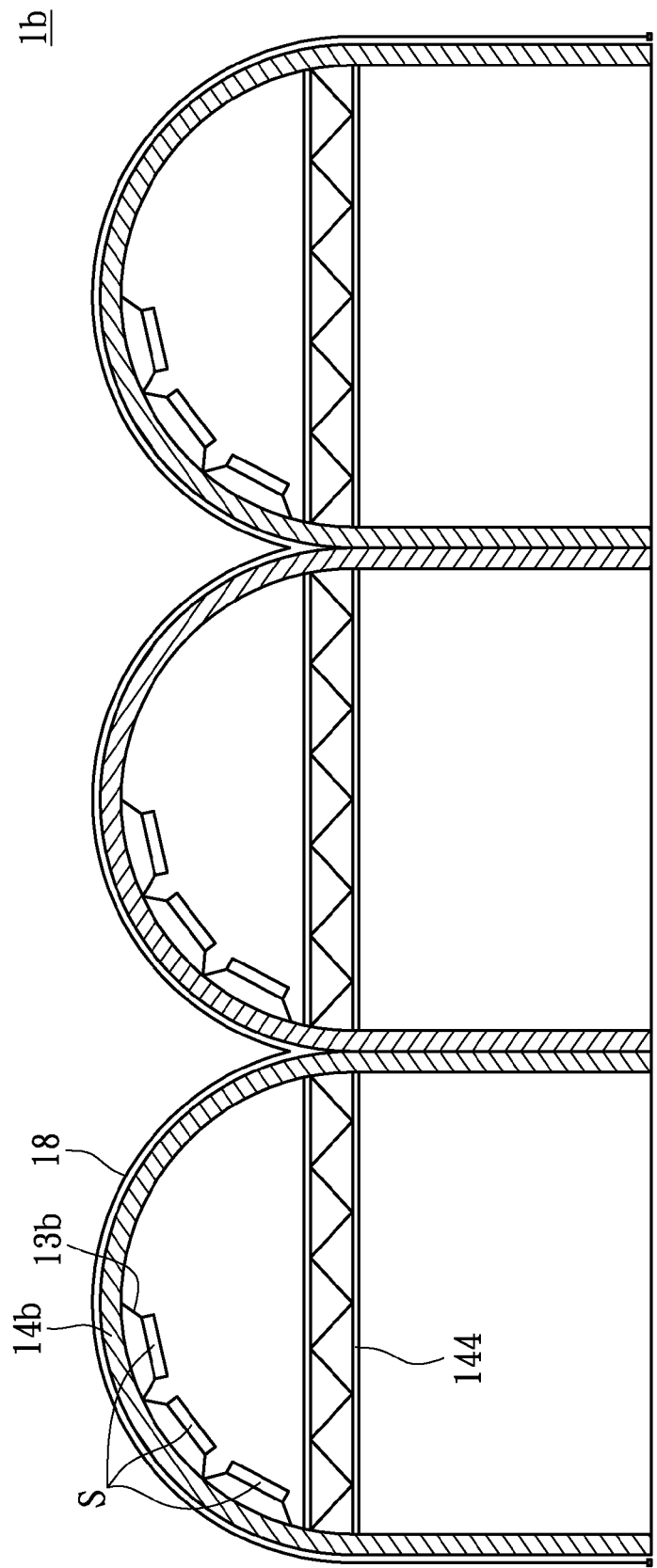
FIG. 3 shows a side view of a solar greenhouse structure for a second embodiment of the instant disclosure.

Please refer to FIG. 3, which shows a side view of a solar greenhouse structure of a second embodiment of the instant disclosure. The solar greenhouse structure 1b of the instant embodiment is applied to plastic agricultural type greenhouses, with a plurality of large arched supporting frames 14b, a plurality of cross-beams 144, a plurality of solar panels S mounted on the supporting frames 14b by a plurality of mounting pieces 13b.

Figure 4:
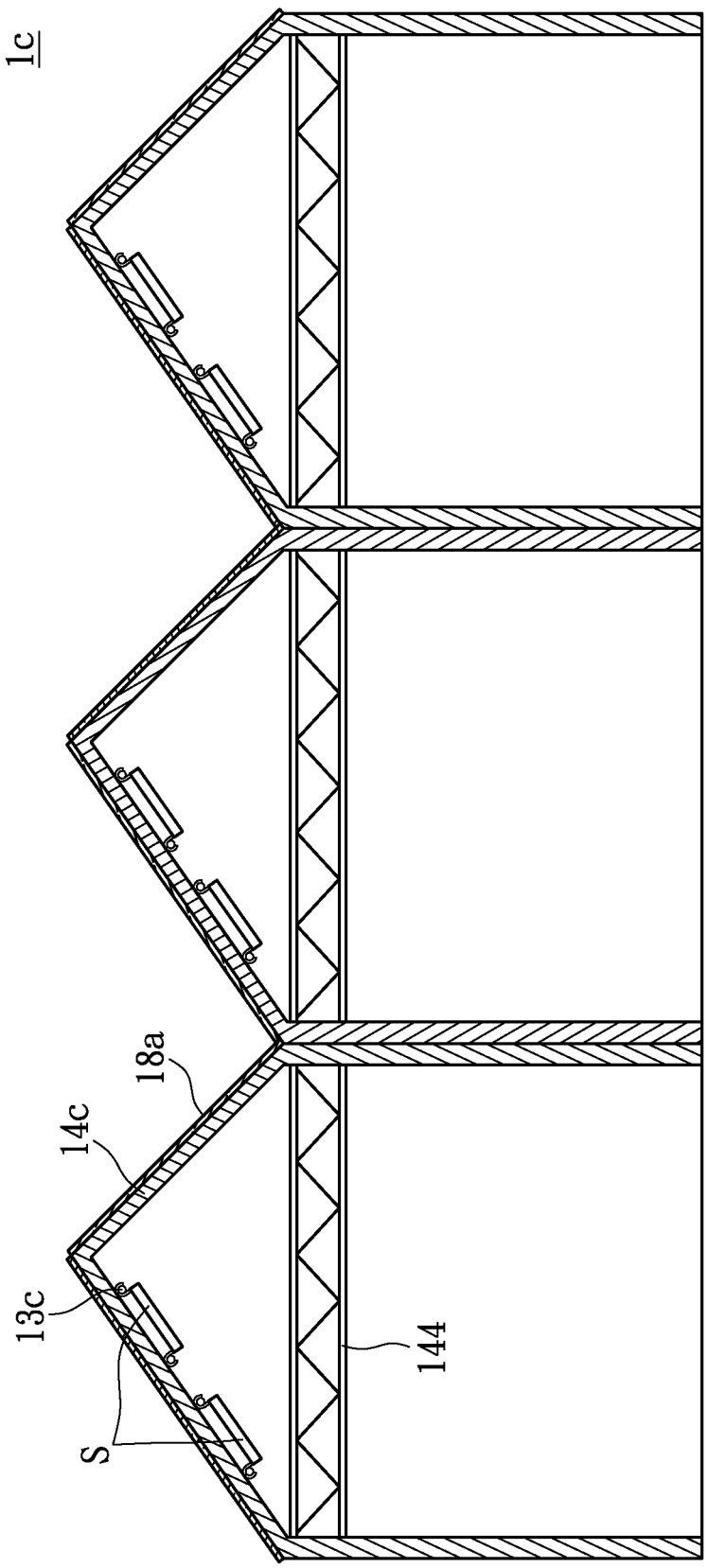
FIG. 4 shows a side view of a solar greenhouse structure for a third embodiment of the instant disclosure.

Please refer to FIG. 4, which shows a side view of a solar greenhouse structure of a third embodiment of the instant disclosure. The solar greenhouse structure 1c of the instant disclosure is applied to the Holland Greenhouse which is a modern type of greenhouse. The solar greenhouse structure 1c comprises a plurality of inclined supporting frames 14c, a plurality of cross-beams 144, and a roof 18a made of hard roof tiles. The solar panels S are mounted on the supporting frames 14c by a plurality of mounting pieces 13c. For the instant embodiment, the roof 18a usually comprises transparent glasses, which can even allow the solar panels S to be directly disposed thereon.

Figure 5:
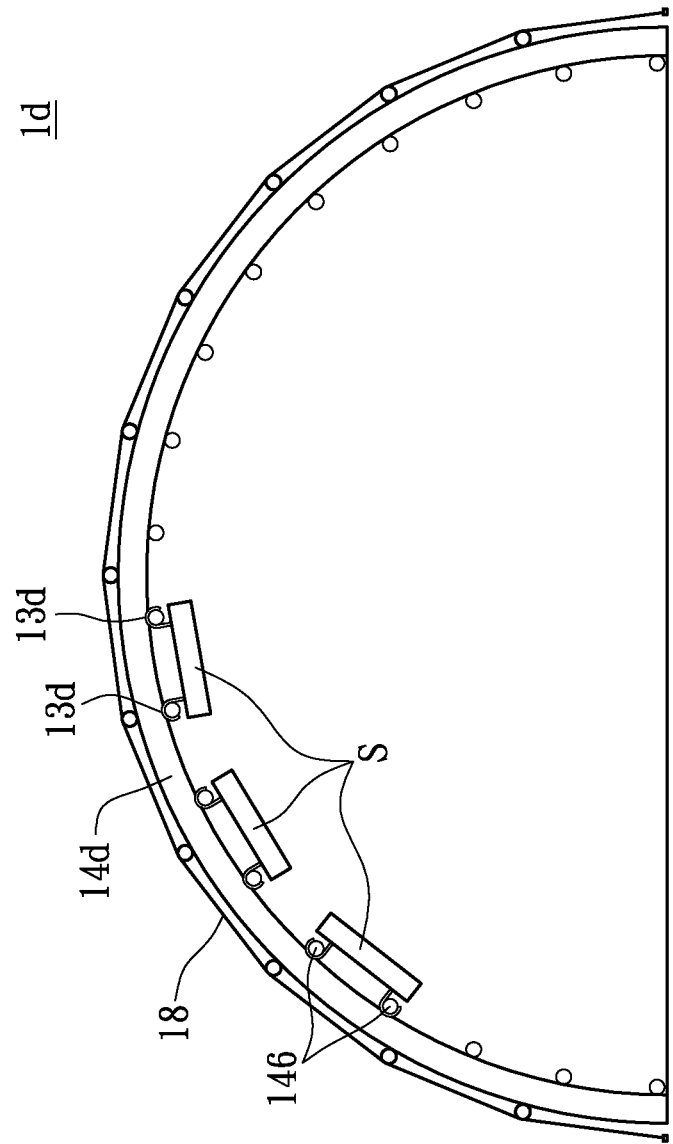
FIG. 5 shows a side view of a solar greenhouse structure for a fourth embodiment of the instant disclosure.

Please refer to FIG. 5, which shows a side view of a solar panel structure for a fourth embodiment of the instant disclosure. The solar greenhouse structure 1d of the instant disclosure is applied to greenhouses built in a "bow" shape, which comprises a plurality of arched supporting frames 14d, a plurality of transverse bars 146, and a plurality of solar panels S hanging off the transverse bars 146 by a plurality of mounting pieces 13d.

Figure 6:
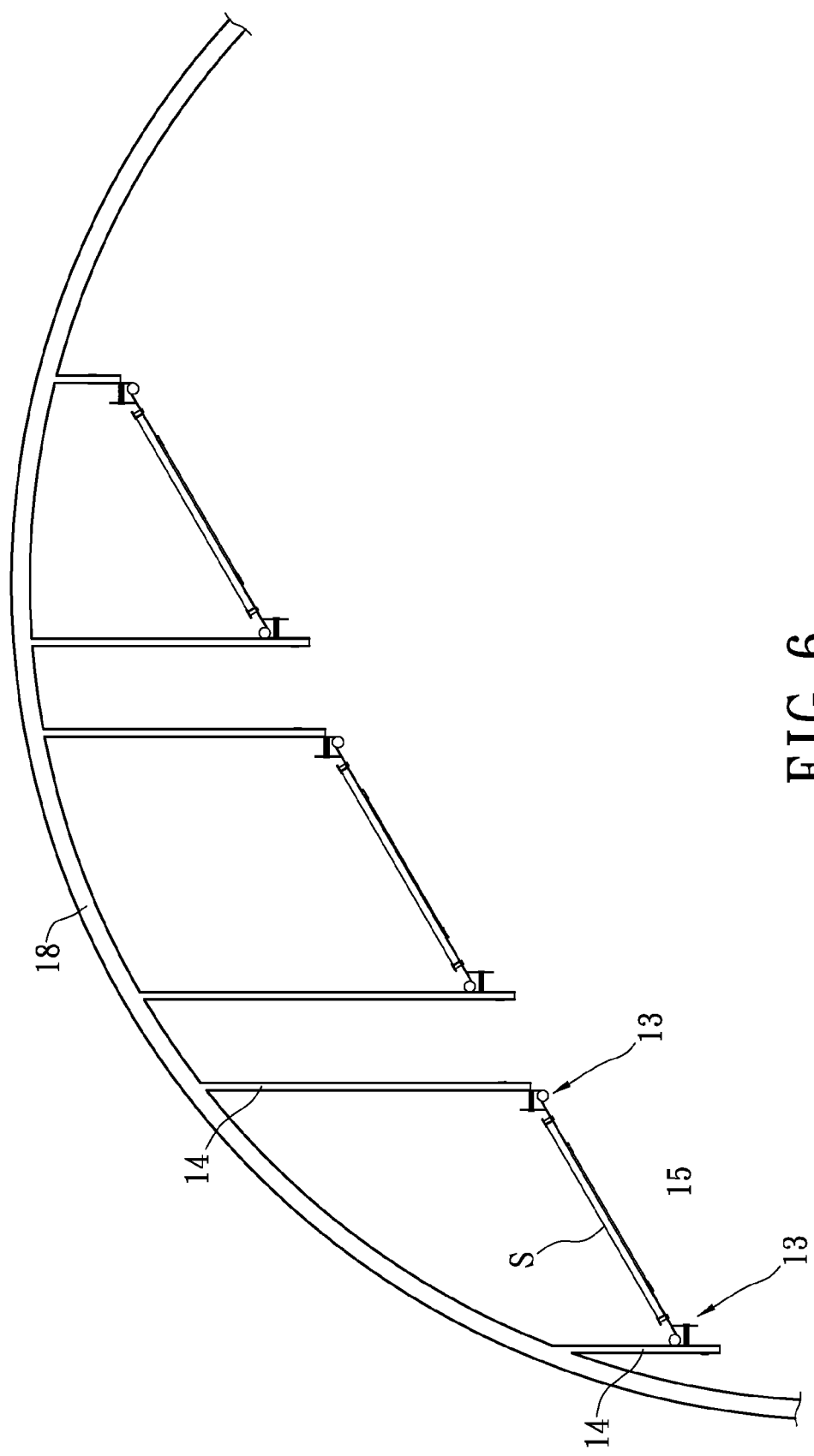
FIG. 6 shows a side view of solar panels hung off the supporting frames by mounting device of first embodiment according to the instant disclosure.

Please refer to FIG. 6, which shows a side view of an embodiment how the solar panels S are hung off the supporting frames. To adapt to the solar greenhouses having supporting frame with different slopes and different sunshine conditions at various areas, the present disclosure has a plurality of mounting device 13 to hang the solar panels S on the supporting frames 14 in different inclined way. Each mounting device 13 has a first holder 131 and a second holder 132 pivotably connected to the first holder 131. The first holder 131 holds an edge of the solar panel S, and the second holder 132 is fixed to the supporting frame 14 of the light-permitting roof structure 18. Therefore, the solar panels S can be arranged under the roof structure 18 in an inclined way according to the slope of the roof panel 18.

Figure 7A:
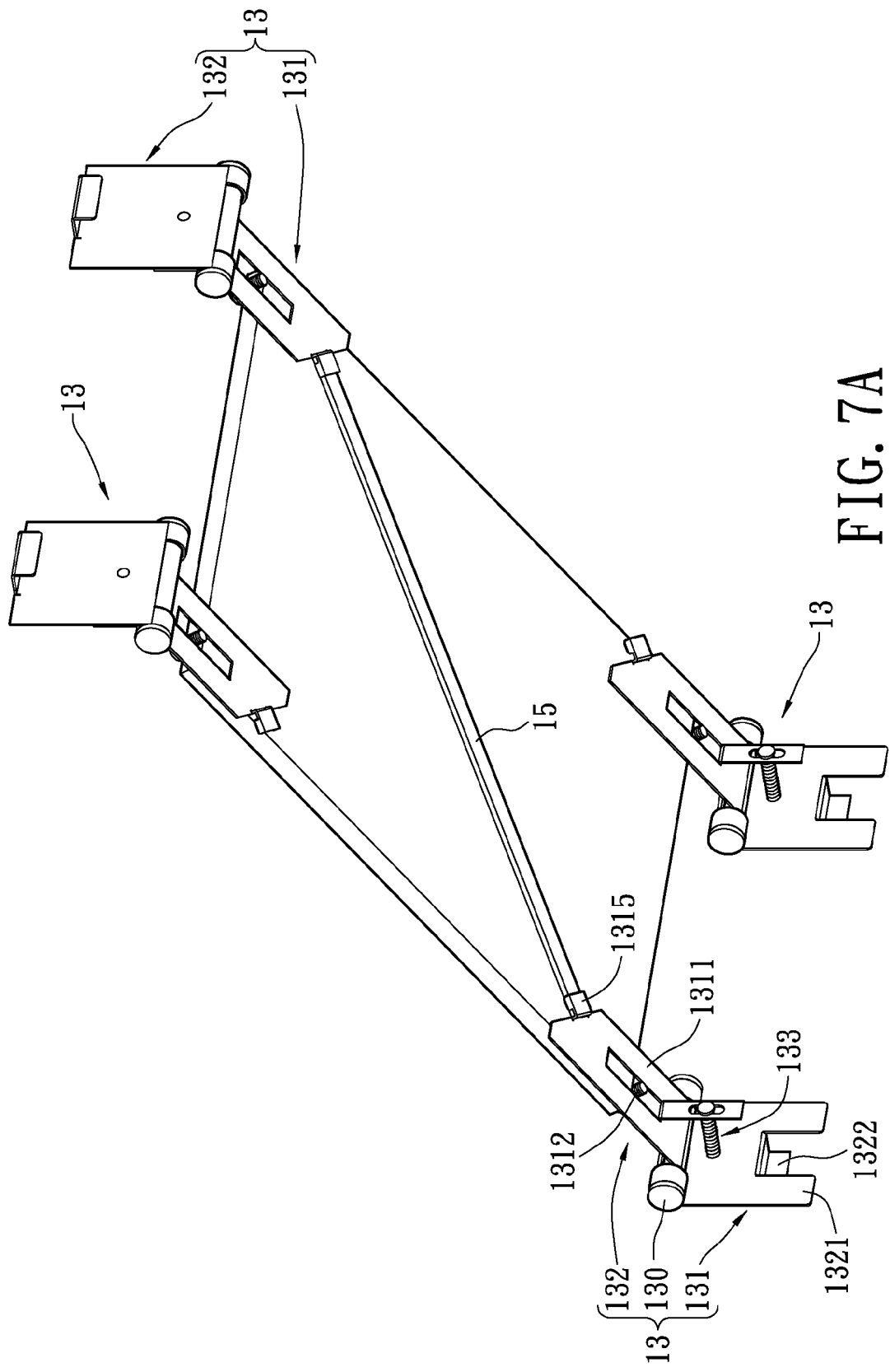
FIG. 7A shows a perspective view of mounting devices of FIG. 6 fixed to a solar panel according to the instant disclosure.
Figure 7B:
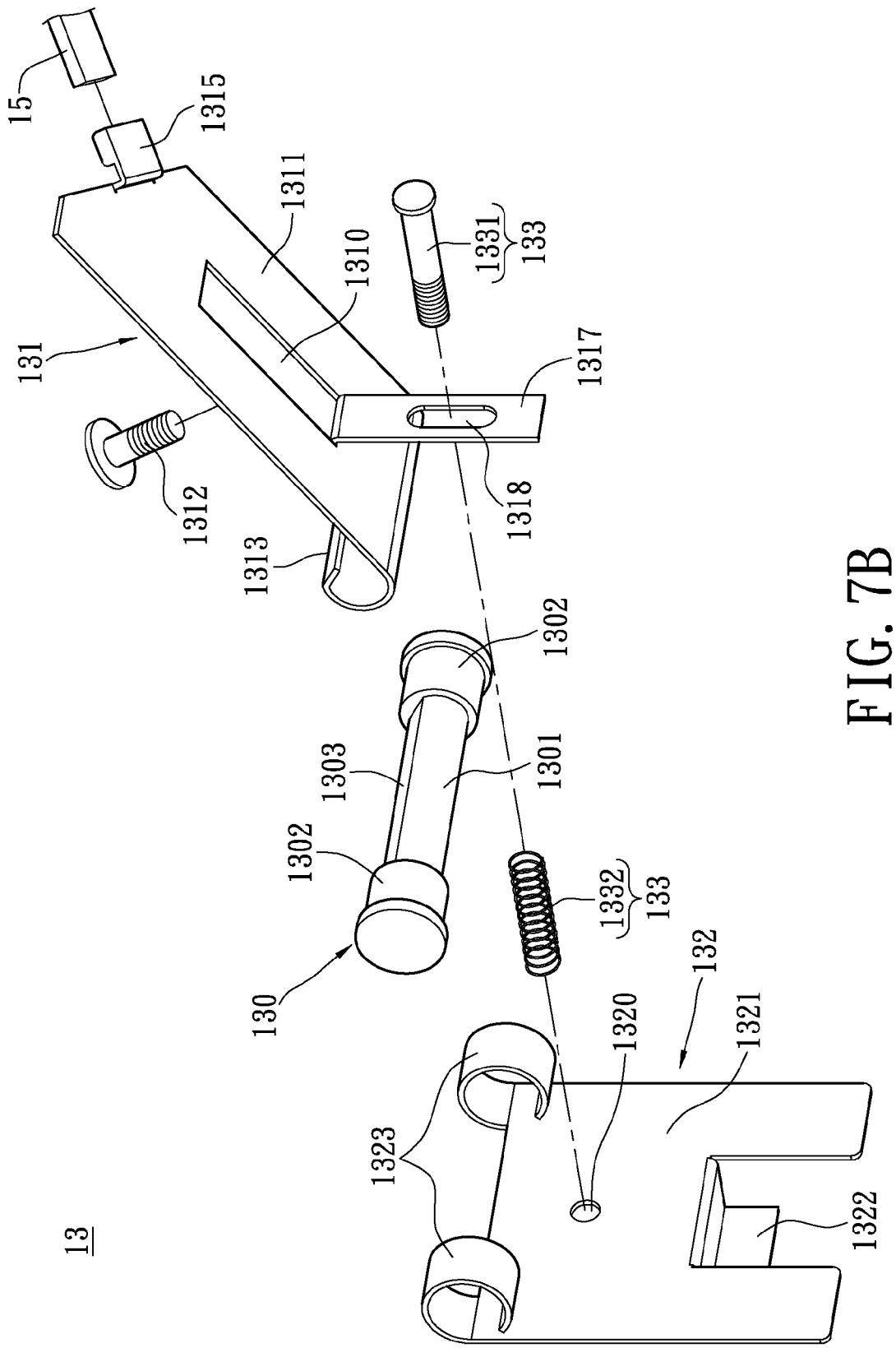
FIG. 7B shows an exploded view of the mounting device of FIG. 6 according to the instant disclosure.

Please refer to FIGS. 7A and 7B, which show the mounting devices fixed to a solar panel and an exploded view of the mounting device of first embodiment. In this embodiment, each solar panel S has four mounting devices 13 arranged at four corners of the solar panel S. The first holder 131 has a clamping piece 1312 to clamp one edge of the solar panel S. The second holder 132 has a fixing piece 1322 fixed to the supporting frame 14. The first holder 131 has a first base 1311 and the second holder 132 has a second base 1321. In this embodiment, the fixing piece 1322 is a hook integrally formed on one end of the second holder 132 opposite to the first holder 131. The hook 1322 is substantially L-shaped and hooked to the supporting frame 14, which is punched and bent from the second base 1321. Therefore, according to this embodiment, the solar panels S can be easily to fix the supporting frame 14 of the roof structure 18, just by a hanging action.

Please refer to FIG. 7B. Each of the mounting device 13 includes a pivotal axle 130 connected to one end of the first holder 131 and one end of the second holder 132, and an adjusting element 133 for adjusting an included angle between the first holder 131 and the second holder 132. The pivotal axle 130 has a post portion 1301 and two cylindrical portions 1302 formed at two ends of the post portion 1301. The first base 1311 has one end is clamped to the post portion 1301, and the second base 1321 has one end is pivotably connected to the cylindrical portions 1302. In this embodiment, one end of the first base 1311 is rolled up to form a clamping portion 1311 and clamped the post portion 1301. The post portion 1301 is formed with a blocked plane 1303 for limiting the rotation of the first base 1311 related to the pivotal axle 130. One end of the second base 1321 is protruded with two rolling portions 1323 in a rolled shape, and rotatably mounted on the cylindrical portions 1302 respectively.

Concerning the adjusting element 133, the first base 1311 has an leg 1317 punched and bent partially therefrom. The adjusting element 133 has a screwing rod 1331 passing the leg 1317 and screwed to the screwing hole 1320 of the second base 1321, and a spring 1332 disposed between the leg 1317 of the first base 1311 and the second base 1321. The screwing rod 1331 extends coaxially through the spring 1332. The leg 1317 is formed with a slot 1318 and the screwing rod 1331 passes through the slot 1318. The screwing rod 1331 can adjust a distance between the leg 1317 and the second base 1321, so that an included angle between the first base 1311 and the second base 1321 is adjusted. The spring 1332 provides elasticity for expanding the leg 1317 at the included angle related to the second base 1321.

To enhance the supporting strength for the solar panel S, each of the solar panel S has at least one supporting piece 15 disposed on a bottom surface thereof. The supporting piece 15 is fixed to two of the first holders 1311 fixed on the solar panel S. In this embodiment, each mounting device 13 has a clipping tab 1315 extended from one edge of the first base 131 to clip on the supporting piece 15.

Figure 8A:
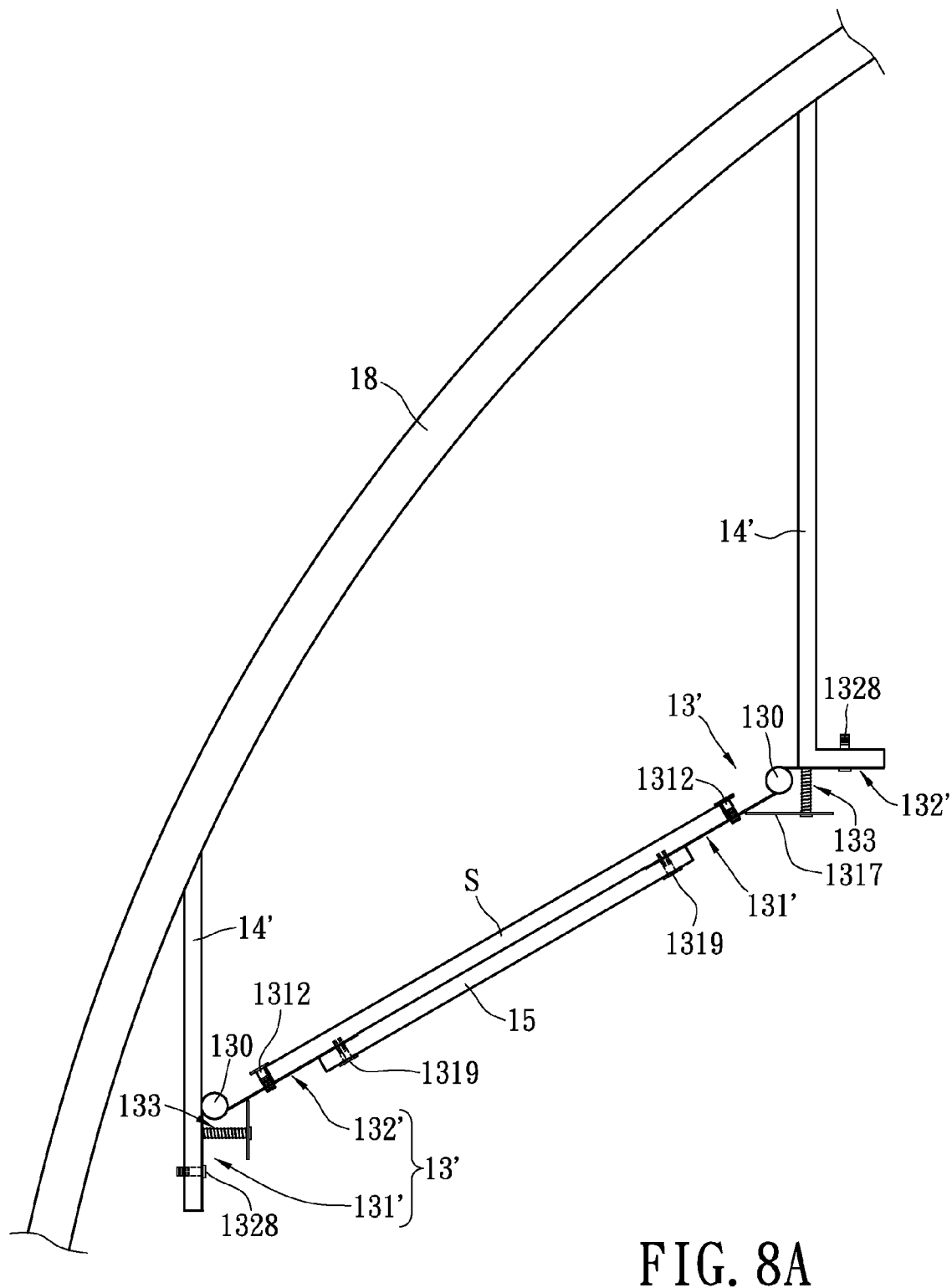
FIG. 8A shows a side view of solar panels hung off the supporting frames by mounting device of second embodiment according to the instant disclosure.
Figure 8B:
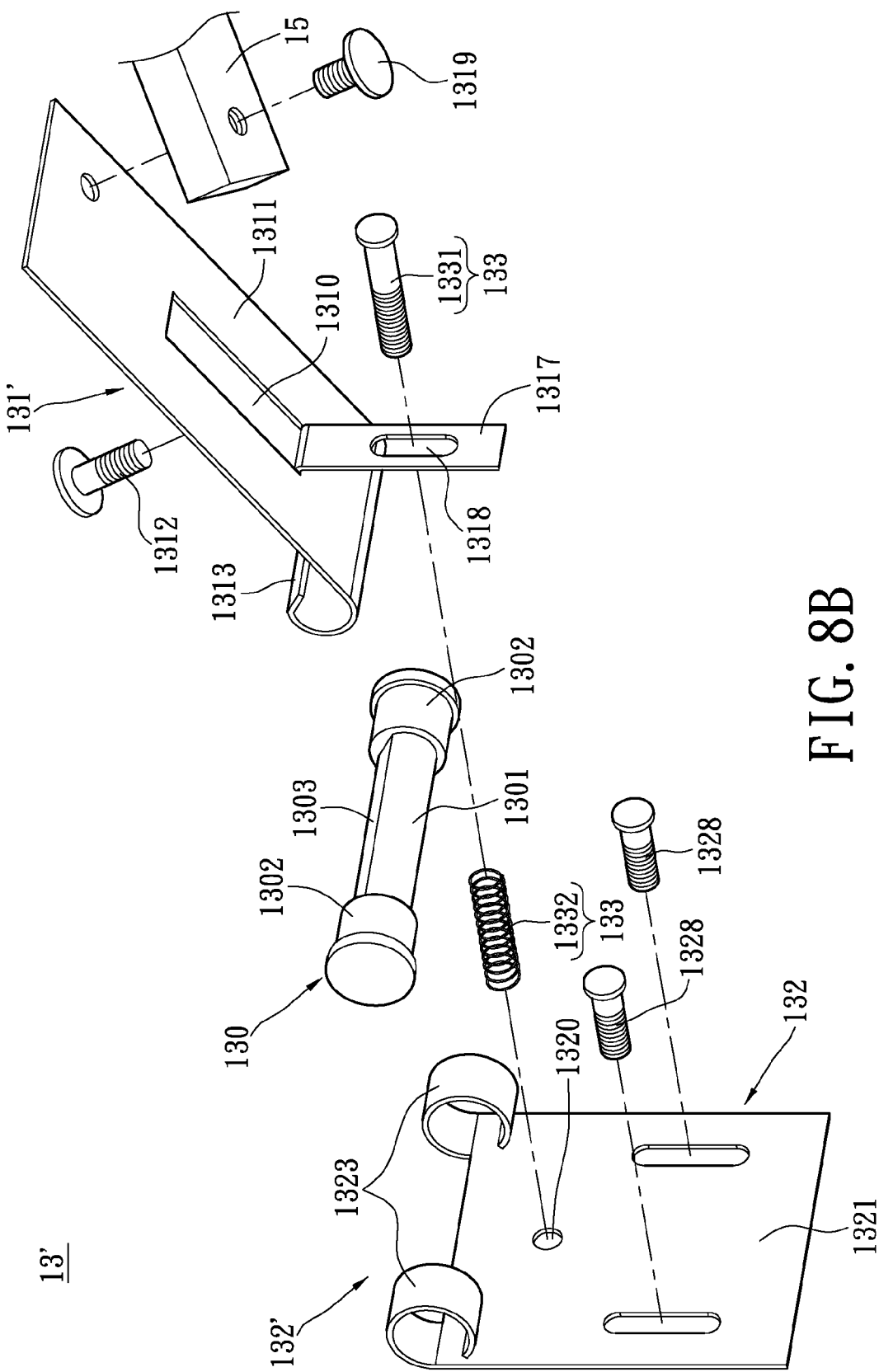
FIG. 8B shows an exploded view of the mounting device of FIG. 8A according to the instant disclosure.

Please refer to FIGS. 8A and 8B, which show the mounting devices fixed to a solar panel and an exploded view of the mounting device of second embodiment. In this embodiment, each mounting device 13' also has a first holder 131' and a second holder 132' pivotably connected to the first holder 131'. The fixing piece of this embodiment is a screw 1328 screwed the second holder 132' to the supporting frame 14'. Each of the first holder 131' is screwed to the supporting piece 15 by a screw 1319. The fixing piece is a screw 1319 screwed the second holder 132' to the supporting frame 14'.

Figure 9:
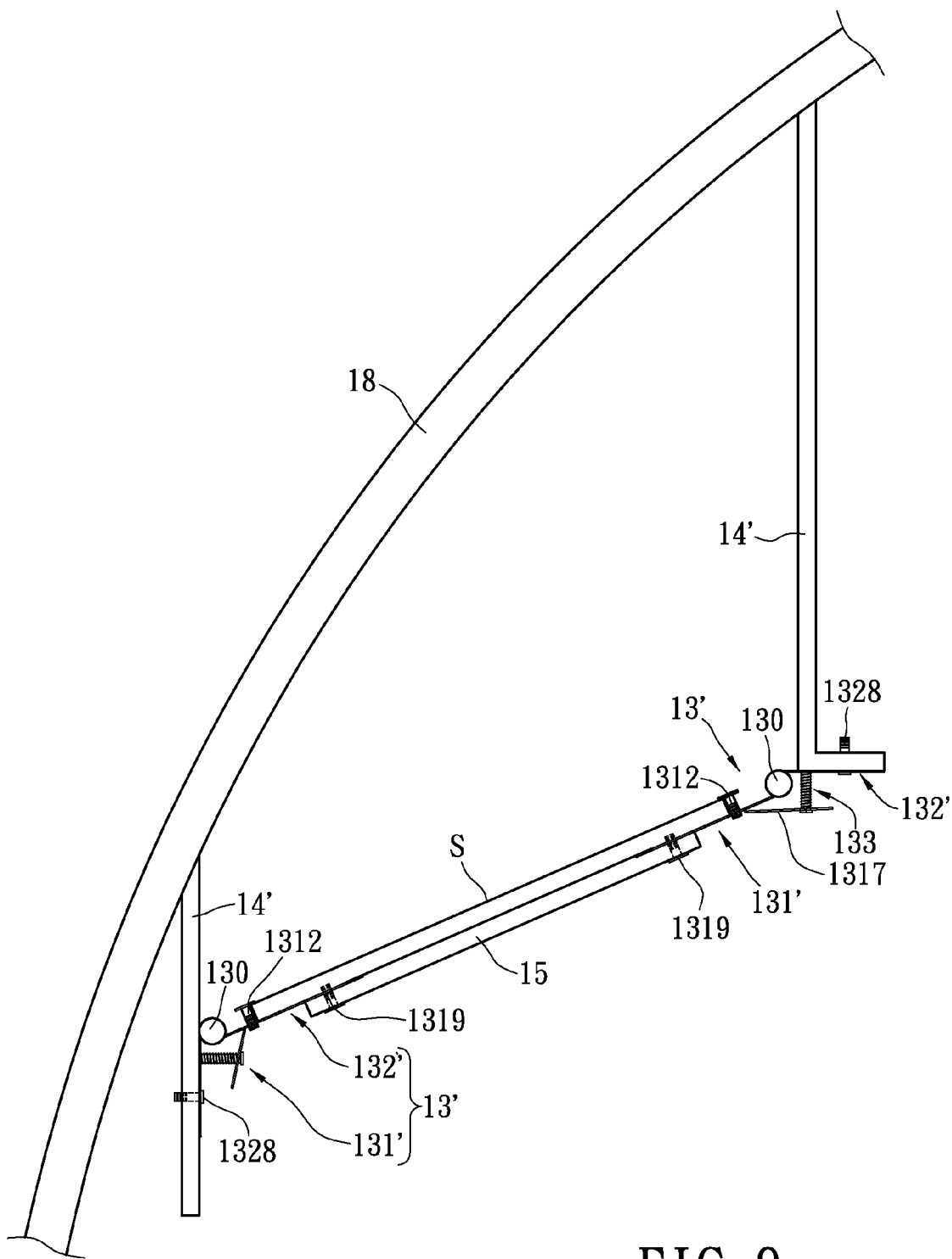
FIG. 9 shows the solar panel is arranged at a slope different from that of the solar panel shown in FIG. 8B according to the instant disclosure.

Please refer to FIG. 9, which shows the solar panel is arranged at a slope lower that of the solar panel shown in FIG. 8B. If the solar panel S would be arranged at different inclined condition. The mounting device 13 can be mounted at different location of the supporting frame 14', and the included angle between the first holder 131' and the second holder 132' can be adjusted by adjusting the adjusting element 133. For example, in this figure, the adjusting element 133 is screwed tightly toward left, and the left mounting device 13' has a smaller included angle.

Based on the embodiments of the instant disclosure, the advantages include the reduced dependency of solar panels on the ambient condition. With the greenhouse providing external protection against hails and temperature changes, the thickness of the solar panels can be reduced to have lighter weight. By using lighter solar panels, the rigidity requirement of the supporting frames of the greenhouse structure can be lowered in reducing the construction cost. Thus, the overall structural cost is lowered. Furthermore, the embodiments of the instant disclosure allows removable insulating layer for summer condition, which can provide cooling and adequate ventilation effects. Also, the existing greenhouse needs no additional remodeling, where the solar panels can be added directly to the existing structure.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A solar greenhouse structure, comprising: a plurality of supporting frames; a light-permitting roof structure having at least one roof panel supported by at least one of the supporting frame, the roof panel having a top surface and a bottom surface; at least one solar panel disposed below the roof structure and near the bottom surface of the roof panel; and a plurality of mounting devices, each mounting device of the plurality of mounting devices having a first holder and a second holder connected to the first holder, the first holder holding an edge of the solar panel, the second holder fixed to the supporting frame of the light-permitting roof structure; wherein each mounting device of the plurality of mounting devices further includes a pivotal axle connected to one end of the first holder and one end of the second holder, and an adjusting element for adjusting an angle between the first holder and the second holder.

2. The solar greenhouse structure of claim 1, wherein the first holder has a clamping piece to clamp one edge of the solar panel, wherein the second holder has a fixing piece fixed to the supporting frame.

3. The solar greenhouse structure of claim 2, wherein the fixing piece is a hook formed on one end of the second holder opposite to the first holder, the hook is hooked to the supporting frame.

4. The solar greenhouse structure of claim 1, wherein the first holder has a first base and the second holder has a second base, the first base having an leg punched and bent partially therefrom, wherein the adjusting element has a screwing rod passing the leg and screwed to the second base and a spring disposed between the leg of the first base and the second base.

5. The solar greenhouse structure of claim 4, wherein the pivotal axle has a post portion and two cylindrical portions formed at two ends of the post portion, wherein the first base has one end clamped to the post portion, and the second base has one end pivotably connected to the cylindrical portions.

6. The solar greenhouse structure of claim 1, wherein each solar panel of the at least one solar panel has at least one supporting piece disposed on a bottom surface thereof, wherein the at least one supporting piece is fixed to two of the first holders fixed on the at least one solar panel.

7. The solar greenhouse structure of claim 6, wherein each first holder has a clipping tab extended from one edge thereof to clip on the at least one supporting piece.

8. The solar greenhouse structure of claim 1, wherein the at least one solar panel comprises a plurality of solar panels arranged under the roof structure in an inclined way according to a slope of the roof panel.

9. The solar greenhouse structure of claim 1, wherein the at least one solar panel is a semi-transparent thin film solar module.

10. The solar greenhouse structure of claim 1, wherein the at least one solar panel is a dye-sensitized solar cell.

11. The solar greenhouse structure of claim 1, wherein the at least one solar panel is a transparent solar module.

* * * * *